Figure 1:
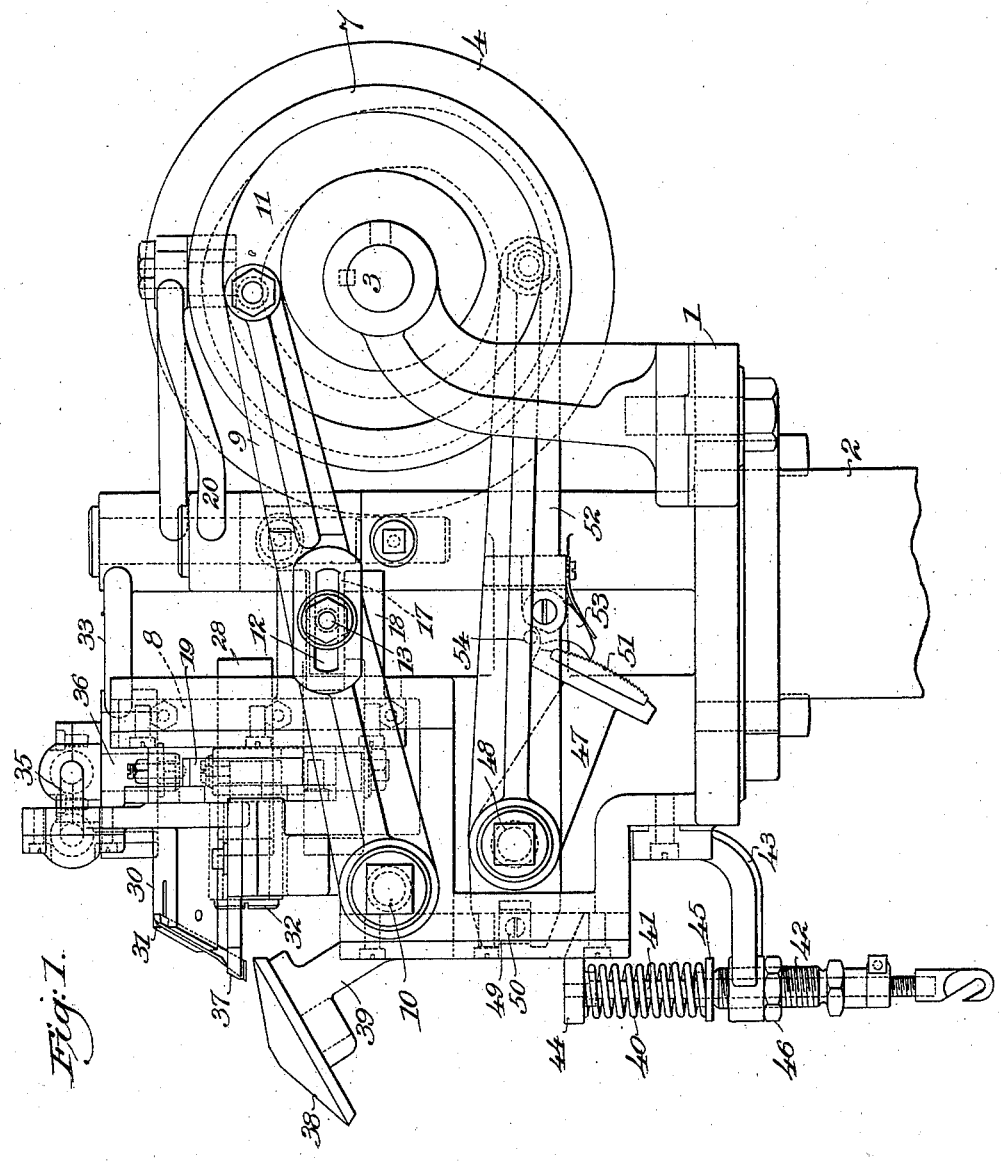

No. 691,903. Patented Jan. 28, 1902.
J. B. HADAWAY.
STITCH SEPARATING MACHINE.
(Application filed Mar. 18, 1901.)
(No Model.) 7 Sheets—Sheet 1.

No. 691,903. Patented Jan. 28, 1902.
J. B. HADAWAY.
STITCH SEPARATING MACHINE.
(Application filed Mar. 18, 1901.)
(No Model.) 7 Sheets—Sheet 2.

No. 691,903. Patented Jan. 28, 1902.
J. B. HADAWAY.
STITCH SEPARATING MACHINE.
(Application filed Mar. 18, 1901.)

(No Model.) 7 Sheets—Sheet 3.

Witnesses:
John F. G. Prinkert
Horace Van Everen

Inventor:
John B. Hadaway
by his Attorney
Benjamin Phillips

No. 691,903. Patented Jan. 28, 1902.
J. B. HADAWAY.
STITCH SEPARATING MACHINE.
(Application filed Mar. 18, 1901.)

(No Model.) 7 Sheets—Sheet 4.

Witnesses: Inventor:
John B. Hadaway
by his Attorney
Benjamin Phillips

No. 691,903. Patented Jan. 28, 1902.
J. B. HADAWAY.
STITCH SEPARATING MACHINE.
(Application filed Mar. 18, 1901.)
(No Model.) 7 Sheets—Sheet 5.
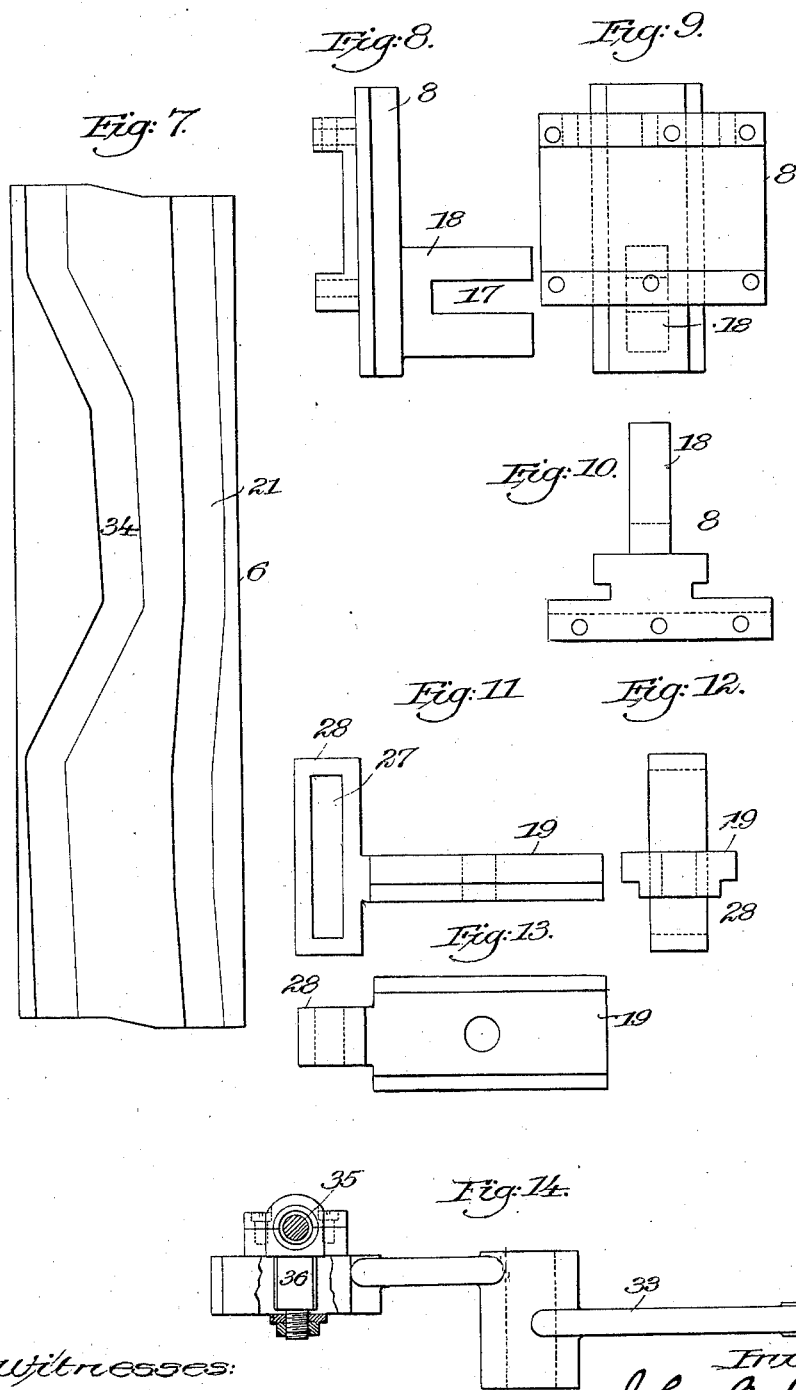

No. 691,903. Patented Jan. 28, 1902.
J. B. HADAWAY.
STITCH SEPARATING MACHINE.
(Application filed Mar. 18, 1901.)

(No Model.) 7 Sheets—Sheet 6.

No. 691,903. Patented Jan. 28, 1902.
J. B. HADAWAY.
STITCH SEPARATING MACHINE.
(Application filed Mar. 18, 1901.)
(No Model.) 7 Sheets—Sheet 7.

UNITED STATES PATENT OFFICE.

JOHN B. HADAWAY, OF BROCKTON, MASSACHUSETTS.

STITCH-SEPARATING MACHINE.

SPECIFICATION forming part of Letters Patent No. 691,903, dated January 28, 1902.

Application filed March 18, 1901. Serial No. 51,752. (No model.)

*To all whom it may concern:*

Be it known that I, JOHN B. HADAWAY, a citizen of the United States, residing at Brockton, in the county of Plymouth and State of Massachusetts, have invented certain new and useful Improvements in Stitch-Separating Machines; and I do hereby declare the following to be a full, clear, and exact description of the invention, such as will enable others skilled in the art to which it appertains to make and use the same.

The present invention relates to stitch-separating machines which are now commonly used in the manufacture of boots and shoes to indent the intervals between the stitches appearing on the upper surface of the edge of the sole to thereby prick up and separate the stitches and impart a finished appearance to the seam. More particularly my invention relates to that class of such machines which act on the stitches after the seam has been finished.

To produce the best results, the tool of a stitch-separating machine should be provided with a comparatively sharp point or working end to enter the stitch intervals, as thereby the resistance offered to the tool by the work, which is always considerable, is lessened and the machine is rendered easier of operation and can be run at a higher rate of speed. Also the tool can locate itself in the stitch intervals with greater certainty when, as in all commercially practical machines, means are provided for allowing the tool to be located in the stitch intervals when slight variations occur in the length of the stitches. The tool also has a firmer engagement with the work and acts with greater certainty to feed the work when, as in many stitch-separating machines, means are provided for imparting a feeding movement to the tool.

In all stitch-separating machines with which I am familiar the tool is not moved with relation to the work while in the stitch interval and under indenting pressure. In such machines, therefore, the shape of the working end of the tool is determined by the shape of the indentation it is desired to make. For this reason the operation of machines of the prior art on certain classes of work in which the indentations are wide and shallow has been unsatisfactory, as the blunt-pointed tool required cannot be located properly in the stitch intervals nor used to feed the work with certainty. Moreover, the resistance offered to the tool by the work is increased and the operation of the machine rendered unsatisfactory for this reason.

One of the objects of my present invention is to provide a machine in which an indenting-tool having a comparatively sharp point or working end to indent the stitch intervals can be used regardless of the shape of the indentations which it is desired to make; and with this object in view a feature of my invention consists in providing a stitch-separating machine with means for oscillating the indenting-tool while in a stitch interval and under indenting pressure about an axis in proximity to the working end of the tool. By so oscillating the tool a sharp-pointed tool having the advantages above set forth can be employed and the indentations can be made of any desired width.

In the embodiment of my invention hereinafter described the axis about which the tool is oscillated is located so as to be coincident with the point of the tool. It is to be understood, however, that my invention is not limited to a construction in which the axis of oscillation is so located, but may be embodied in a construction in which the axis is located above or below the working end of the tool, but in proximity thereto, so that an oscillation of the tool about its axis will widen the indentation.

The stitches of the outseam of a boot or shoe vary more or less in length, and in a commercially practical stitch-separating machine means must be provided for compensating for these variations in order to prevent the indenting-tool striking on the crowns of the stitches and injuring the thread and marring instead of improving the appearance of the seam. To cause the indenting-tool to be located in the stitch intervals, whether the stitches are of uniform or varying lengths, stitch-separating machines have been provided with means to actuate the tool to cause it to locate itself in the stitch intervals or with means which allow the work to shift under the action of the tool to bring the stitch intervals in line with the path of movement of the tool. All stitch-separating machines with which I am familiar, however, are constructed to impart to the indenting-tool a movement perpendicular to the line of the seam to bring the tool into contact with the work. As a result of this construction when a variation occurs in the length of the stitches the stitch interval to be indented is located outside of the path of movement of the tool a distance equal to the amount the stitch differs in length from the average or normal stitch, and the tool must be moved this distance from its normal path of movement or act on a portion of the stitch at this distance from the stitch interval to shift the work in order to locate the tool in the stitch interval.

One of the objects of my invention is to provide a stitch-separating machine in which this effect of variations in the length of the stitches is reduced, whereby the tool acts with greater certainty to locate itself in the stitch intervals and the machine can operate satisfactorily upon seams having variations in the length of the stitches which cannot be compensated for in prior machines.

To this end a feature of my invention consists in providing a stitch-separating machine with means for imparting to the indenting-tool a movement oblique to the line of the seam to bring the tool into contact with the work. By so moving the tool a variation in the length of the stitches displaces the stitch interval to be indented a distance from the path of movement of the tool less than the amount the stitch differs in length from the average, and the tool readily locates itself in the stitch interval, even if the variation in the length of the stitch is considerable.

A further object of my invention is to improve and simplify the construction and operation of stitch-separating machines; and with this object in view my invention also consists in the devices and combinations of devices hereinafter described and claimed, the advantages of which will be obvious to those skilled in the art from the description hereinafter contained.

A machine embodying the several features of my invention in their preferred form is illustrated in the accompanying drawings, to which embodiment, however, my invention is not limited, as it may be embodied in many different constructions without departing from the spirit thereof.

Figure 2:
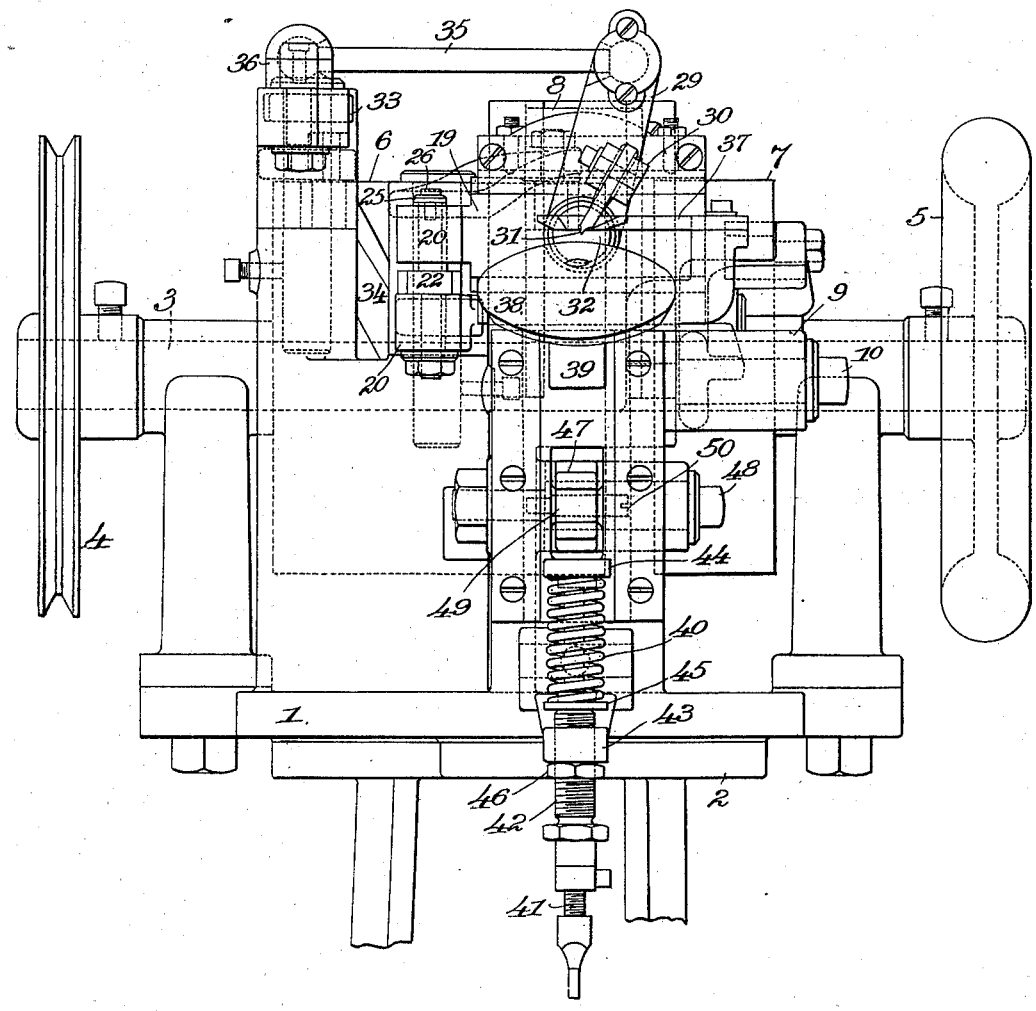
Figure 3:
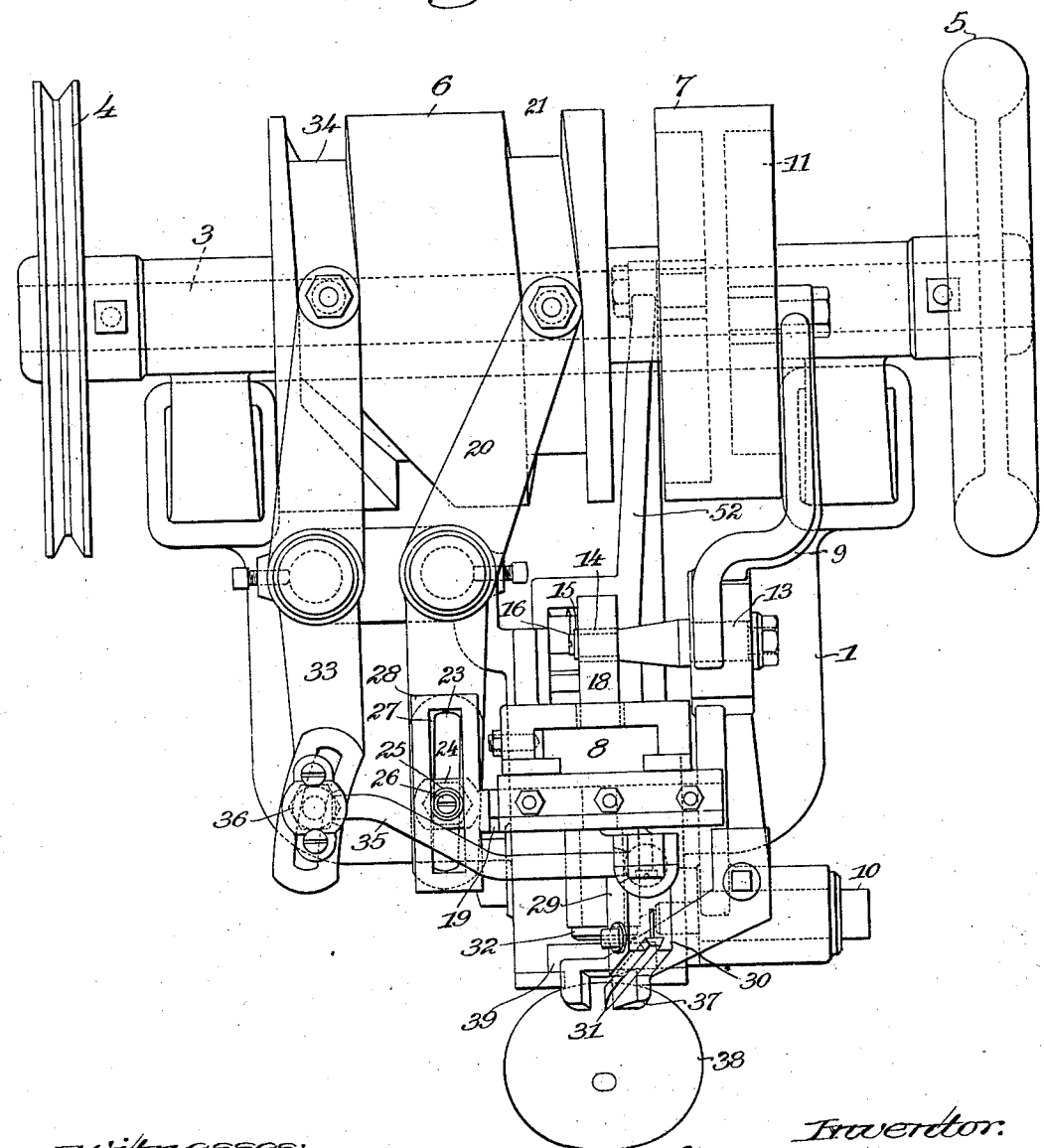
Figure 4:
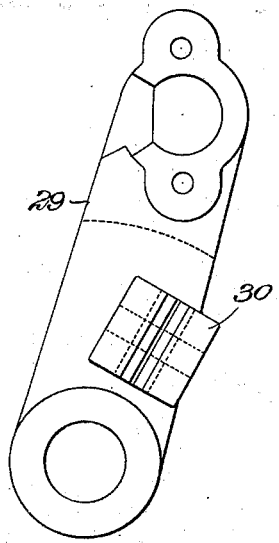
Figure 5:
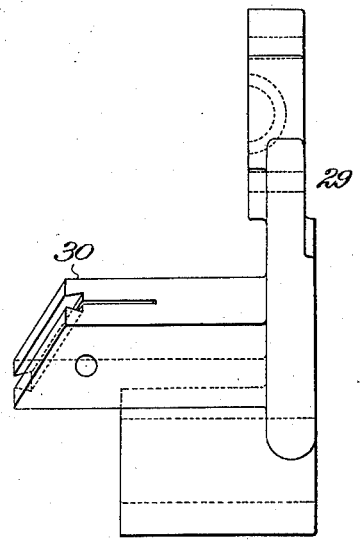
Figure 6:
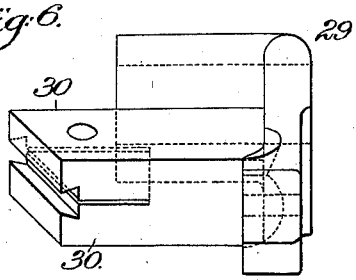
Figures 15, 16:
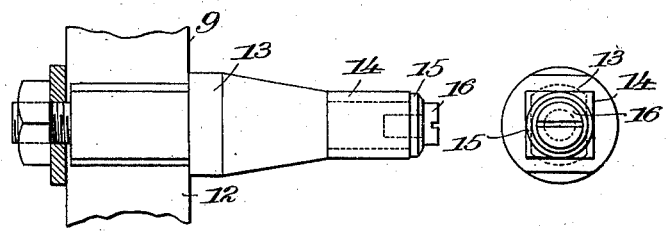
Figures 17, 18:
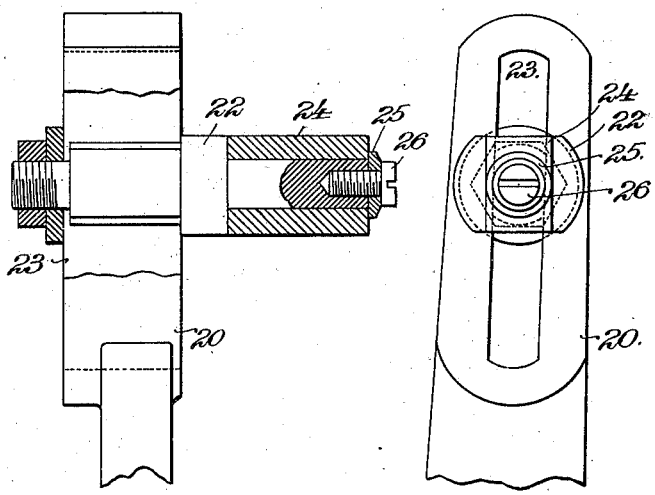
Figure 19:
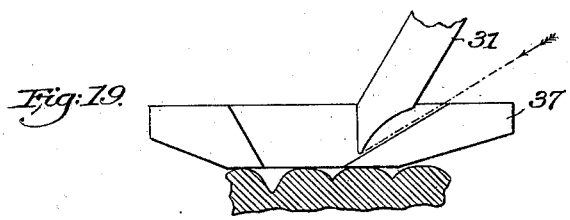

Referring to the drawings, Figure 1 is a view in end elevation of a stitch-separating machine embodying my invention. Fig. 2 is a view in front elevation thereof. Fig. 3 is a plan view. Figs. 4, 5, and 6 are front, side, and plan views, respectively, of the tool-stock. Fig. 7 shows a development of the cam from which the horizontal and oscillating movements are imparted to the indenting-tool. Figs. 8, 9, and 10 are views in end and front elevation and in plan of the vertically-reciprocating slide which moves the indenting-tool toward and from the work. Figs. 11, 12, and 13 are views in plan, end elevation, and front elevation of the horizontally-reciprocating slide which moves the tool horizontally. Fig. 14 is a view in side elevation of the lever which forms a portion of the mechanism which oscillates the indenting-tool, the end of the lever being broken away to show the adjustable block which forms the connection between the lever and the rod which connects the lever to the tool-stock. Fig. 15 is a view in side elevation of the adjustable block which forms the connection between the vertically-reciprocating slide shown in Figs. 8, 9, and 10 and its actuating-lever, a portion of the lever being shown in section. Fig. 16 is an end view of the block shown in Fig. 15. Figs. 17 and 18 are side and plan views of the end of the lever which actuates the horizontally-reciprocating slide shown in Figs. 11, 12, and 13, also showing the block which forms the adjustable connection between the lever and the slide. Figs. 19 to 23 are diagrammatic views illustrating the operation of the tool in indenting the stitch intervals.

1 indicates the frame of the machine, of any suitable construction for supporting the operating parts, bolted upon the upper end of a suitable standard 2. Journaled in standards at the rear of the machine-frame is a driving-shaft 3, to which are secured the belt-pulley 4, hand-wheel 5, and the cam-disks 6 and 7, the disks 6 and 7 being provided with suitably-shaped cam-grooves, from which the moving parts of the machine are operated, as will be hereinafter described. Mounted in suitable guideways in the machine-frame is a vertically-reciprocating slide 8. (Shown separately in Figs. 8, 9, and 10.) This slide is reciprocated in its guideways to move the tool toward and from the work by means of a lever 9, pivoted upon a horizontal pivot-pin 10 at the front of the machine-frame and provided at its rear end with a roll which engages the cam-groove 11 in one face of the cam-disk 7. About midway its length the lever 9 is provided with a slot 12, in which a block 13 is adjustably secured, as shown in Fig. 15. The block 13 extends laterally from the lever 9 and is provided at its end with a block 14, rotatably mounted thereon and held in position by means of the washer 15 and headed screw 16. The block 14 is received in a slot 17 in a rearwardly-projecting portion 18 of the slide 8. By the construction above described as the shaft 3 rotates lever 9 is oscillated about its pivot 10 and the slide 8 is reciprocated in its guideways by the engagement of the block 14 with the slot 17. By adjusting the block 13 in the slot 12 the extent of the reciprocations imparted to the block 8 can be varied for a purpose which will be hereinafter described.

The slide 8 has formed therein or secured thereto horizontal guideways, in which is mounted a slide 19. (Shown separately in Figs. 11, 12, and 13.) The slide 19 is reciprocated in its guideways on the slide 8 by means of a lever 20, pivoted midway its length upon the frame of the machine, so as to oscillate in a horizontal plane. The rear end of lever 20 is provided with a roll which engages the cam-groove 21 in the disk 6, and its forward end is connected to the slide 19. The connection between the slide 19 and lever 20 is illustrated in Figs. 17 and 18 and consists of a block 22, adjustably secured in a slot 23 in the end of the lever. The block 22 extends upwardly from the lever 20, and upon the reduced upper end of the block is rotatably mounted a block 24, held in position thereon by means of the washer 25 and headed screw 26. The block 24 extends into a slot 27 in a lateral projection 28 at one end of the slide 19. As a result of this construction the slide 19 is reciprocated in its guideways on the slide 8 by the oscillations of the lever 20, and at the same time the slide 19 can be moved vertically with the slide 8, the block 24 engaging the slot 27, permitting such movement without becoming disengaged therefrom. By adjusting the block 22 in the slot 23 the extent of the horizontal movements imparted to the slide 19 can be varied for a purpose to be hereinafter described.

29 designates the tool-stock in the clamping-jaws 30, on which the indenting-tool 31 is secured. The tool-stock 29 is pivotally mounted at its lower end upon a horizontal pivot-pin 32, projecting from the slide 19. The tool-stock is oscillated above the pivot 32 by means of a lever 33, pivoted upon the frame of the machine to oscillate in a horizontal plane. The rear end of lever 33 is provided with a roll which engages a cam-groove 34 in the disk 6, and its forward end is connected by means of a link 35 to the upper end of the tool-stock 29. The connection between the lever 33 and link 35 is shown in Fig. 14 and consists of a block 36, adjustably secured in a curved slot in the end of the lever. By adjusting the block 36 in the slot in the lever the extent of the oscillating movements imparted to the tool can be varied to cause the tool to oscillate more or less while in a stitch interval or to compensate for changes in the adjustment of the mechanism for actuating the slide 19. To allow for the vertical and horizontal movements of the tool-stock due to the movements of slides 8 and 19, the ends of the link 35 are provided with spherical portions which are received in spherical sockets in the tool-stock and in the block 36, thereby forming universal joints.

For supporting and guiding the work during the operation of the indenting-tool the following mechanism is provided: 37 designates an upper work-support and crease-gage which is secured to the front portion of the frame of the machine and extends horizontally over the lower work-support 38 into a position to enter the crease between the upper and the welt. The upper work-support and gage 37 is provided with an opening through which the indenting-tool passes. The lower work-support 38 consists of a beveled-faced wheel rotatably mounted at the upper end of a slide 39, mounted to reciprocate in guideways at the front of the machine-frame. The slide is arranged to yield vertically, so that the work-support 38 automatically accommodates itself to different thicknesses of stock. To allow the slide to yield, it is pressed upwardly by means of a coiled spring 40, surrounding a rod 41, mounted to reciprocate in a sleeve 42, screwing through a bracket 43, projecting from the frame of the machine, said spring being interposed between a projection 44 on the slide 39 and a washer 45, resting on the upper end of sleeve 42. By reason of its screw-threaded engagement with the bracket 43 the sleeve 42 can be adjusted to vary the tension of spring 40, being locked in position after adjustment by the locking-nut 46. The rod 41 is secured to the projection 44 and is connected to a treadle, (not shown,) whereby the slide 39 and work-support 38 can be depressed against the tension of spring 40 to allow the insertion of the work beneath the upper work-support and gage 37.

In order to lock the slide 39 against downward movement during the action of the tool, a lever 47, pivoted at 48, is provided, the slotted front end of which engages a block 49, loosely mounted upon a pin 50, extending across an opening in the slide 39, and the rear end of which is provided with a ratchet-toothed segment 51. Also pivoted at 48 is a locking-lever 52, upon which is pivotally mounted a spring-pressed pawl or pawls 53, which are arranged to engage the teeth of the toothed segment 51 when the lever 52 is depressed, and thereby force the slide 39 and work-support 38 upwardly and lock them in raised position. The lever 52 is actuated by means of a cam-groove in one face of the disk 7, with which a roll on the rear end of the lever engages. In the upward movement of the lever 52 the pawls 53 contact with a pin 54 on the frame of the machine, and are thereby actuated to disengage the ratchet-segment 51 and release the work-support.

Figure 20:
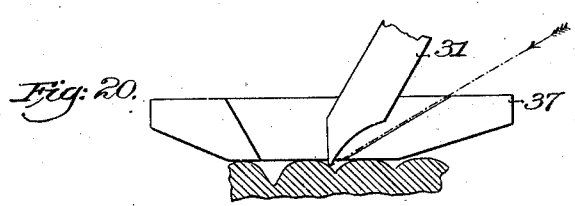
Figure 21:
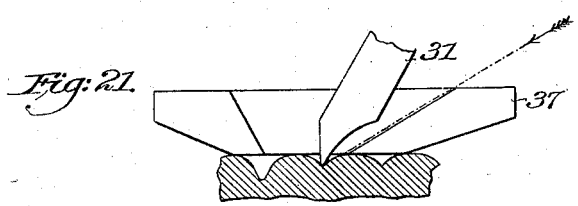
Figure 22:
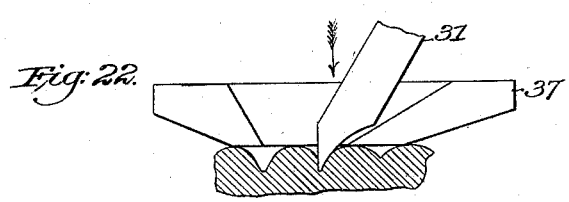
Figure 23:
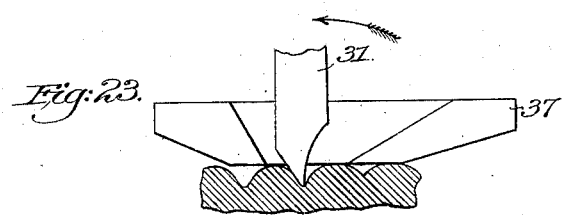

The operation of the machine above described will be clearly understood from an inspection of Figs. 19 to 23 and is as follows: Starting with the slide 8 at the limit of its upward movement and at the limit of its movement to the right as viewed from the front of the machine and with the upper end of the tool-stock swung to the right, at which point in the operation of the machine the tool is in the position shown in Fig. 19, the slides 8 and 19 are simultaneously actuated to cause the tool to move toward the work in the direction indicated by the arrow in Fig. 19, such direction being oblique to the line of the seam. Before or during its movement and before the tool contacts with the work the lever 52 is actuated to raise and lock the lower work-support, and the work-support is held locked during the continued action of the tool and until the tool is withdrawn from the work, the upward movement of the lower work-support not being sufficient, however, to clamp the work against the upper work-support 37, so as to prevent the work being fed by the tool. In its descent in a direction oblique to the line of the seam the tool contacts with the rounded end of the stitch in advance of the stitch interval to be indented and in close proximity to the bottom of the stitch interval, as shown in Fig. 20. During its continued movement in the same direction the tool acts to feed the work and at the same time by pressing upon the rounded end of the stitch forces the work ahead until the tool has located itself in the bottom of the stitch interval, as shown in Fig. 21. A further movement is now given to the tool to cause the tool to indent the work, and this movement in the machine shown in the drawings is perpendicular to the line of the seam, the said movement being produced by the continued downward movement of slide 8, the slide 19 remaining stationary with relation to slide 8. During the downward movement of the indenting-tool the tool is in an inclined position, as shown in Fig. 22, and in order to prevent the end of the stitch in the rear of the stitch interval being indented from being unduly crushed or flattened the face of the tool which contacts with this portion of the stitch is cut away, as shown, so that the tool acts to give the desired shape to this portion of the stitch. While the tool is still under indenting pressure it is oscillated, by means of the lever 23 and connections hereinbefore described, until it assumes an upright position, and during this movement the tool presses against the end of the stitch in advance of the interval being indented and widens out the indentation. After the tool has been moved by the slide 8 to indent the stitch interval the slide 19 is actuated to move the tool to the left in order to feed the work, and with the parts arranged as shown in the drawings this feeding movement of the tool takes place after the tool has been swung into an upright position, as shown in Fig. 23, the parts being so timed that the tool is maintained in its upright position during the feeding movement. After having fed the work the tool is raised and returned to its original position, and during this return movement of the tool the lower work-support is unlocked, the tension of spring 40 being sufficient to hold the work in position. Preferably the indenting-tool will be adjusted in the clamping-jaws 30 to bring the point of the tool in line with the axis about which the tool oscillates, so that the feeding movement is independent of the oscillating movement and the point of the tool remains in contact with the bottom of the stitch interval during the oscillation of the tool. From an inspection of Figs. 19, 20, and 21 it will be apparent that the indenting-tool will strike upon the shoulder of the stitch in advance of the interval to be indented, in close proximity to the bottom of the stitch interval, regardless of the length of the stitch, the effect of variations in the length of the stitches being to cause the tool to contact with the work sooner or later than in the case of a stitch of normal length, but at substantially the same distance from the bottom of the stitch interval. By adjusting either or both of the blocks 13 and 22 in the slots 12 and 23 of the levers 9 and 20 the relative movements of the slides 8 and 19 can be varied, and thereby the inclination to the line of the seam of the path of movement of the indenting-tool. Also by these adjustments the extent of the movements imparted to the tool can be adjusted to correspond to the length of the stitches in the work to be operated upon and to produce indentations of the desired depth.

Having thus described my invention, I claim as new and desire to secure by Letters Patent of the United States—

1. A stitch-separating machine, having, in combination, a work-support, an indenting-tool, means for actuating the tool to indent the stitch intervals, and means independent of the work for oscillating the tool while in a stitch interval about an axis in proximity to the working end of the tool to widen the indentation, substantially as described.

2. A stitch-separating machine, having, in combination, a work-support, an indenting-tool, means for actuating the tool to indent the stitch intervals and means for oscillating the tool while in a stitch interval and under indenting pressure about an axis in proximity to the working end of the tool to widen the indentation, substantially as described.

3. A stitch-separating machine, having, in combination, an indenting-tool, means for imparting to the tool a movement oblique to the line of the same to bring the tool into contact with the work, and a further movement to indent the work, substantially as described.

4. A stitch-separating machine, having, in combination, an indenting-tool, means for imparting to the tool a movement oblique to the line of the seam to bring the tool into contact with the work, and a movement perpendicular to the seam to indent the work, substantially as described.

5. A stitch-separating machine, having, in combination, a work-support, an indenting-tool, means for actuating the tool to indent the work, means for oscillating the tool while in engagement with the work and independent means for actuating the tool to feed the work, substantially as described.

6. A stitch-separating machine, having, in combination, an indenting-tool, a work-support arranged to allow the work to move under the action of the tool, means for imparting to the tool a positive movement oblique to the line of the seam to locate the tool in a stitch interval, and a further positive movement to indent the stitch interval, substantially as described.

7. A stitch-separating machine, having, in combination, an indenting-tool, a work-support arranged to allow the work to move under the action of the tool, means for imparting to the tool a positive movement oblique to the line of the seam to locate the tool in a stitch interval, and a further positive movement to indent the stitch interval, means for oscillating the tool while under indenting pressure and means to actuate the tool to feed the work, substantially as described.

8. A stitch-separating machine, having, in combination, an indenting-tool, means for imparting to the tool a movement oblique to the line of the seam to bring the tool into contact with the work, and a further movement to indent the work, and means for oscillating the tool while under indenting pressure, substantially as described.

9. A stitch-separating machine, having, in combination, an indenting-tool, means for imparting to the tool a movement oblique to the line of the seam to bring the tool into contact with the work and a further movement to indent the work, and means for actuating the tool to feed the work, substantially as described.

10. A stitch-separating machine, having, in combination, a work-support, an indenting-tool, means for actuating the tool to indent the stitch intervals, means for oscillating the tool while in a stitch interval and under indenting pressure to widen the indentation, and means for moving the tool bodily to feed the work, substantially as described.

11. A stitch-separating machine, having, in combination, a tool movable along a path oblique to the line of the seam to bring the tool in contact with the work and means for relatively moving the tool and work to locate the tool in the intervals between the stitches whether the stitches are of uniform or varying length and to indent the stitch intervals, substantially as described.

In testimony whereof I affix my signature in presence of two witnesses.

JOHN B. HADAWAY.

Witnesses:
FRED O. FISH,
ALFRED H. HILDRETH.